United States Patent
Horsky et al.

(10) Patent No.: US 8,982,668 B2
(45) Date of Patent: Mar. 17, 2015

(54) SEMICONDUCTOR DEVICE AND METHOD OF FORMING SAME FOR CORRELATION DETECTION

(75) Inventors: Pavel Horsky, Brno (CZ); Ivan Koudar, Modrice (CZ); Tomas Suchy, Brno (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1158 days.

(21) Appl. No.: 12/946,550

(22) Filed: Nov. 15, 2010

(65) Prior Publication Data

US 2012/0120768 A1 May 17, 2012

(51) Int. Cl.
| G01S 15/04 | (2006.01) |
| G01S 15/00 | (2006.01) |
| G01S 3/801 | (2006.01) |
| G01S 7/536 | (2006.01) |
| G01S 15/93 | (2006.01) |
| H04L 27/02 | (2006.01) |
| H04L 27/18 | (2006.01) |

(52) U.S. Cl.
CPC ............... G01S 7/536 (2013.01); G01S 15/931 (2013.01); H04L 27/02 (2013.01); H04L 27/18 (2013.01)
USPC ........ 367/93; 367/5; 367/6; 367/100; 367/39; 367/40; 367/41; 367/42; 367/125

(58) Field of Classification Search
USPC ............ 367/5, 6, 100, 39, 40, 41, 42, 125, 93
See application file for complete search history.

(56) References Cited

U.S. PATENT DOCUMENTS

| 4,860,307 | A | * | 8/1989 | Nakayama | 375/145 |
| 5,349,567 | A | * | 9/1994 | Reed | 367/100 |
| 5,629,639 | A | * | 5/1997 | Williams | 327/60 |
| 6,539,320 | B1 | * | 3/2003 | Szajnowski et al. | 702/79 |
| 7,019,509 | B2 | | 3/2006 | Kant | |
| 7,280,624 | B2 | | 10/2007 | Wang | |
| 2011/0242939 | A1 | * | 10/2011 | Pederson | 367/89 |

FOREIGN PATENT DOCUMENTS

| CA | 2405656 A1 | 3/2004 |
| EP | 1032157 A1 | 8/2000 |
| JP | 2002009665 A | 11/2002 |
| JP | 2008109271 A | 8/2008 |

OTHER PUBLICATIONS

Communication of the Preliminary search report; Application No. 11 59978, France; Filed on Nov. 4, 2011; Applicant: Semiconductor Components Industries LLC.

* cited by examiner

*Primary Examiner* — Daniell L Negron
*Assistant Examiner* — John Bamert

(57) ABSTRACT

In an embodiment a semiconductor device correlates a received signal with a known pattern. A correlation output is used as a basis for forming a confidence reference level. The confidence reference level and the correlation output are compared to identify a peak in the received signal indicating that a present signal state of the received signal contains the known pattern.

20 Claims, 7 Drawing Sheets ental object detection and distance measurement is useful in a variety of applications. Distance can be measured using a number of different techniques including radar, sonar, optical reflection, and so on. In some environments there may be a number of different unrelated entities performing distance measurements using similar techniques. For example, vehicle manufacturers increasingly include obstacle detection and distance measurement systems in vehicles for applications such as collision avoidance and parking assistance. These systems use ultrasonic acoustic echo detection to determine distances between the vehicle and a nearby object, as well as the rate of change of distance to an object. Furthermore, manufacturers are increasingly designing these systems to operate in multiple directions, where automobiles can transmit ultrasonic signals in multiple directions to detect objects, including other vehicles, using echo detection. As a result, there can be multiple ultrasonic transmitters operating nearby each other, causing cross talk and other interference which makes it difficult to determine the distance to objects which produce echoes. Accordingly, interference issues need to be addressed in order for such distance measurements to be reliable.

SEMICONDUCTOR DEVICE AND METHOD OF FORMING SAME FOR CORRELATION DETECTION

BACKGROUND

The invention relates generally to methods, semiconductor devices, and products useful in object detection and ultrasonic distance measurement applications.

Automated object detection and distance measurement is useful in a variety of applications. Distance can be measured using a number of different techniques including radar, sonar, optical reflection, and so on. In some environments there may be a number of different unrelated entities performing distance measurements using similar techniques. For example, vehicle manufacturers increasingly include obstacle detection and distance measurement systems in vehicles for applications such as collision avoidance and parking assistance. These systems use ultrasonic acoustic echo detection to determine distances between the vehicle and a nearby object, as well as the rate of change of distance to an object. Furthermore, manufacturers are increasingly designing these systems to operate in multiple directions, where automobiles can transmit ultrasonic signals in multiple directions to detect objects, including other vehicles, using echo detection. As a result, there can be multiple ultrasonic transmitters operating nearby each other, causing cross talk and other interference which makes it difficult to determine the distance to objects which produce echoes. Accordingly, interference issues need to be addressed in order for such distance measurements to be reliable.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

Figure 1:
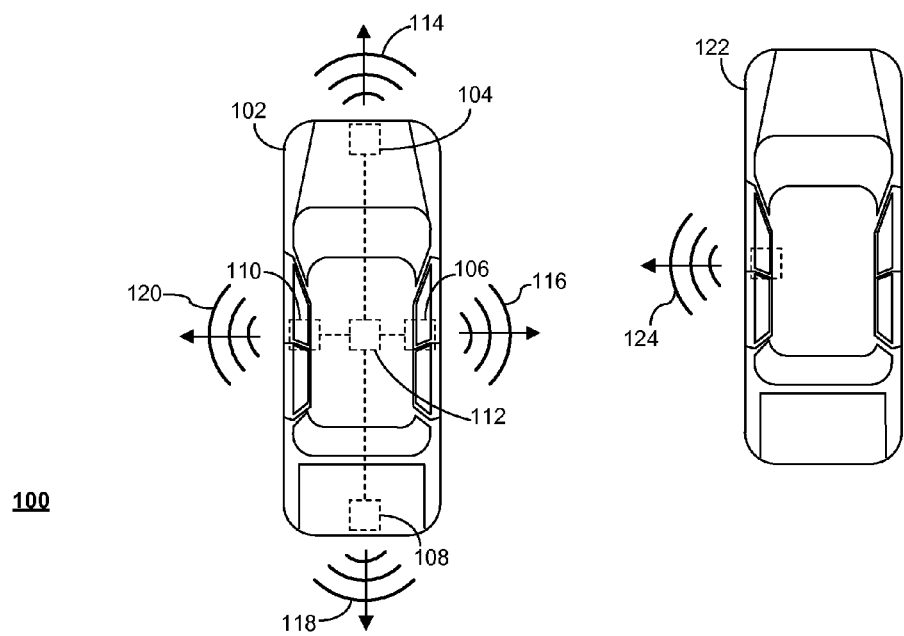
FIG. 1 shows an operating environment of a vehicular application in accordance with an embodiment.

While the specification concludes with claims defining features of embodiments of the invention that are regarded as novel, it is believed that such embodiments will be better understood from a consideration of the description in conjunction with the drawings. As required, detailed embodiments are disclosed herein; however, it is to be understood that the disclosed embodiments are merely exemplary, and can be embodied in various other forms. For example, the invention can be embodied as a semiconductor device or product, a circuit, or a method including a method of configuring a semiconductor device or circuit, among numerous other embodiments. Semiconductor products and devices disclosed herein can be fabricated using conventional techniques, and can include integrated or discrete circuit arrangements, or both. Therefore, specific structural and functional details disclosed herein are not to be interpreted as limiting, but merely as a basis for the claims and as a representative basis for teaching one skilled in the art to variously employ the invention in virtually any appropriately detailed structure. Further, the terms and phrases used herein are not intended to be limiting but rather to provide an understandable description of the invention.

In an ultrasonic distance measurement system ultrasonic acoustic waves are used to determine the distance between the transmission point and an object creating an acoustic reflection or echo, which is detected at or near the transmission point. The time between transmission and reception of the echo indicates the distance to the object that caused the echo. In some applications a change of frequency due to Doppler shift can be detected, indicating the rate of change of distance at the instant the echo was produced. Such systems and products are being increasingly adopted in a wide variety of applications, including, for example, vehicular applications. Ultrasonic distance measurement can be applied, for example, in automotive applications for purposes such as parking assistance and collision avoidance and alert. As the number of vehicles employing such techniques increases, care must be taken to address issues resulting from interference caused by the presence of multiple transmitters in acoustic proximity to each other. Present embodiments address the problem of noise caused by cross talk, as well as autocorrelation noise, by using a unique modulation code for each transmitter, and using a correlator and reference signal generation techniques to detect echoes of the uniquely modulated signals. The correlator continuously compares the received signal state with the unique modulation pattern, and generates a correlation signal indicative of the degree of correlation between the present signal state and the unique modulation pattern. An averaging process and a modification process are applied to the correlator output signal to produce a confidence reference level signal which is compared to the correlator output signal. When peaks of the correlator output signal exceed the confidence reference level by a prescribed amount, an echo of the transmitted signal has been detected, and further processing can determine the distance to the object that produced the echo, the rate of change of distance, and so on.

Referring to FIG. 1, there is shown an operating environment 100 of a vehicular application in accordance with an embodiment. A first vehicle 102 has multiple ultrasonic measurement modules 104, 106, 108, 110, for performing distance measurements in various different directions. The modules can be coordinated and controlled by a central controller 112. Each module can include an acoustic transmitter circuit and receiver circuit, and an acoustic transducer coupled to the transmitter and receiver for converting electric signals into ultrasonic wave transmissions, and for receiving ultrasonic echoes and converting the incident echoes and other received ultrasonic signals into electrical signals to be processed by the respective module to determine the distance to an object producing the echo. Accordingly, each of the modules 104, 106, 108, and 110 transmit ultrasonic acoustic waves 114, 116, 118, 120, respectively, in the directions indicated. To reduce interference with each other, and provide timely measurements for proximity detection, each of the modules is assigned a different modulation pattern or code. The use of multiple different codes can enable the use of a set of modules which can operate concurrently at the same or similar ultrasonic frequencies. This significantly increases the measurement repetition rate because each module can discriminate its own pattern. The code is used to modulate an electric carrier wave at a selected carrier frequency. The carrier frequency is typically in the ultrasonic range, and can be particularly selected based on the frequency response of the transducer used by the module, which converts the modulated electric signal to a corresponding acoustic signal. The module generates a modulated burst with its assigned code encoded in the modulation of the transmitted ultrasonic signal. To detect echoes, each module uses correlation techniques to determine if, and when, an echo of its modulated signal is received. Using coded modulation allows multiple transmitters on a single vehicle to operate simultaneously since each module can detect echoes produced by its own uniquely coded signal. Furthermore, nearby vehicles such as vehicle 122 can also operate using substantially unique codes to modulate an acoustic wave 124. Since each module, including the modules of other vehicles, uses a substantially unique modulation code, each module's respective correlation unit is able to detect its respective echoes despite receiving signals from other modules having different codes.

Figure 2:
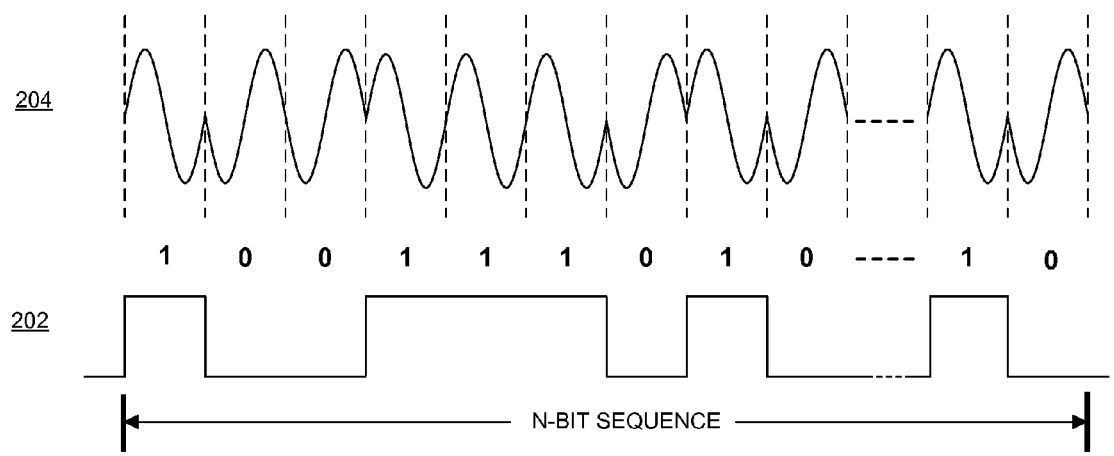
FIG. 2 shows an example of a modulation diagram of an exemplary carrier wave modulated for use by a distance measurement product in accordance with an embodiment.

FIG. 2 shows a modulation diagram 200 of carrier wave modulated for use in an ultrasonic acoustic measurement system in accordance with an embodiment. A modulation pattern 202 can be a bit sequence of N bits that represents a substantially unique code. The modulation pattern can be selected prior to each transmit burst, or it may be a pattern that is assigned upon commencement of operation, or assigned at the time of manufacture, or it can be otherwise adjustable as needed. As shown here, the modulation pattern corresponds to a digital bit sequence of 1's and 0's corresponding to a digital code. The modulation pattern is used to phase modulate an electrical carrier wave to produce a modulated carrier wave pulse 204, which shows the relative magnitude over time of the modulated carrier wave in volts or decibels. The carrier wave can have a frequency in the ultrasonic range, such as, for example, 39 KHz. The modulation scheme illustrated here in carrier wave pulse 204 is binary phase shift keying (BPSK). As mentioned, other forms of phase modulation can be used, such as amplitude phase shift keying (APSK). The modulation pattern can be selected or generated so as to minimize cross correlation and autocorrelation noise, as is known for code sets such as Walsh codes or Gold codes, for example.

Figure 3:
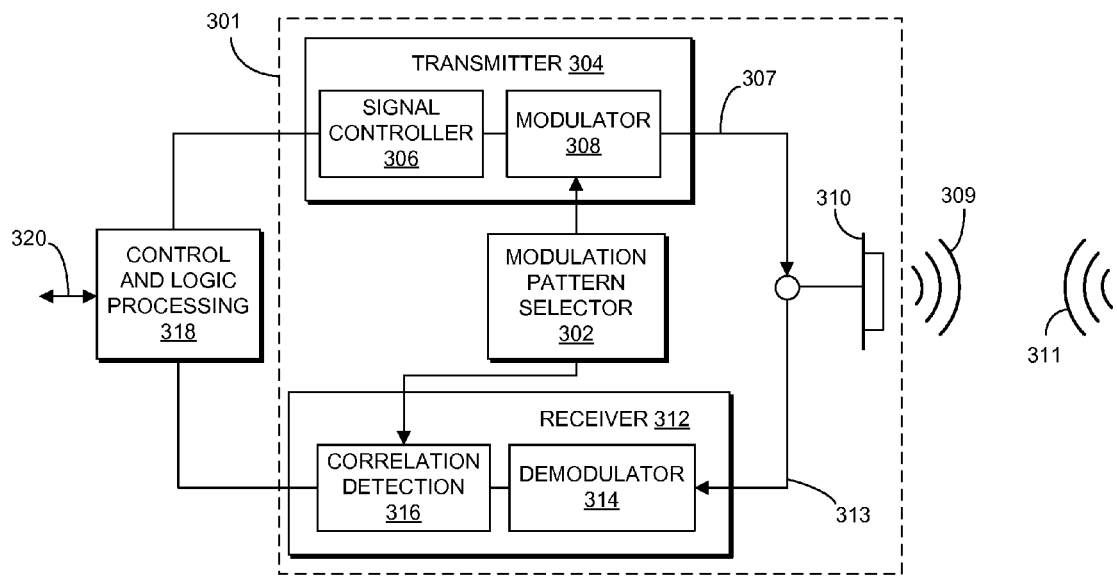
FIG. 3 shows block diagram schematic of a module and controller for use with a distance measurement product, in accordance with an embodiment.

FIG. 3 shows a block circuit diagram schematic 300 including a module 301 and controller 318. These elements can be analogous to elements in modules 104, 106, 108, 110, and controller 112 of FIG. 1, respectively, and can be embodied as components of a semiconductor product, device, or circuit, and produced or formed by a method for forming such products, devices, and circuits. The module 301 comprises a modulation pattern selector 302 which can select or otherwise provide or generate a modulation pattern or code from among a plurality of codes. The plurality of codes can be stored locally. Alternatively, the modulation pattern selector can be a static or fixed code that can be assigned upon manufacture of the module. The modulation code is provided to a transmitter 304 which modulates an electrical carrier wave at a selected ultrasonic frequency in a burst, encoding the modulation code in the resulting modulated signal. A signal controller 306 controls pulse or burst timing, while a modulator 308 modulates the carrier wave according to the provided modulation code. The modulated signal is output 307 to a transducer 310. The transducer can be a piezo-ceramic transducer, and is typically selected to have a frequency response which is compatible with the ultrasonic frequency range used by the modulator, or vice versa. As the modulated signal is applied to the transducer, the transducer generates an acoustic signal 309 that corresponds, in time and relative amplitude over time, to the modulated burst. If an object is sufficiently in range, it will produce an ultrasonic acoustic echo signal 311 by reflecting the transmitted ultrasonic signal. The echo signal will also substantially correspond to the transmitted signal, having a form representative of the modulation pattern used by the modulator.

The reflected echo 311 arrives at the transducer 310, and causes the transducer to produce or generate a corresponding electrical signal, which is provided to a receiver input 313 of a receiver 312. The received signal is processed by a demodulator 314. The demodulator output is provided to a correlation detection unit 316. As will be explained in further detail in reference to subsequent figures, the correlation detection unit correlates the modulation pattern with the demodulator output, and generates a confidence reference level based on the degree of correlation as indicated by a correlator output signal. The correlator output signal is compared to the confidence reference level for peak detection to identify correlation peaks that indicate reception of an echo having a pattern corresponding to the transmitted pattern. When the demodulator output sufficiently correlates with the modulation code, as indicated by the comparison of the correlator output signal with the confidence reference level, the correlation detection unit 316 provides an indication of echo detection to a controller 318. The controller can determine the timing difference between the time of transmission and the time of reception of the echo to determine the distance to the object that produced the echo. Furthermore the receiver 312 can determine the degree of Doppler shift in the received signal based on the difference in frequency between the received signal and the transmitted signal, and indicate the degree of Doppler shift to the controller 318. The controller in turn can communicate with other components of the system via a bus 320 for applications such as parking assistance and collision avoidance, providing timing and other information as can be desired by such applications.

The correlation detection unit 316 comprises a correlator which correlates a present signal state of a received signal with the transmitted modulation code. The correlator produces a correlator output signal indicative of the level of correlation between the present signal state and the modulation code. The present signal state is maintained by shifting sampled time-values of the received signal into a buffer and performing the correlation at each time interval. Detection of an obstacle occurs when there is a sufficiently high peak in the correlator output signal relative to the confidence reference level. Other smaller peaks can occur before and after the high peak indicating sufficient correlation. These smaller peaks can be the product of autocorrelation and cross correlation noise, although the codes can be selected to minimize autocorrelation and cross correlation effects. Autocorrelation peaks do not represent detection of valid obstacles and need to be suppressed. Similarly cross correlation peaks do not represent valid obstacle detection. Cross correlation noise occurs when a signal produced by another module substantially correlates with the modulation code used by the receiving module. The magnitude of cross correlation noise depends on the codes used by other modules. Despite selecting substantially unique codes to reduce cross correlation noise, cross correlation peaks can occur which could, using conventional techniques, cause a false detection. The invention substantially suppresses both auto and cross correlation noise peaks to substantially eliminate false obstacle detection, while allowing detection of the peaks produced when the autocorrelation shift state of the received signal matches the transmitted code. Accordingly, each module is provided with means to perform correlation detection in accordance with embodiments taught herein in order to suppress the effects of both cross correlation and autocorrelation noise. In particular, each module develops a confidence reference level (CRL) which corresponds to a noise level of the received signal and is used for detection of sufficient correlation between the transmitted modulation code and the received signal. Comparing the correlator output to the CRL facilitates determination of the probable confidence that an obstacle is present at a given distance. The magnitude of the CRL is an indication of the background noise level which affects the quality of the ultrasonic measurement channel.

Figure 4:
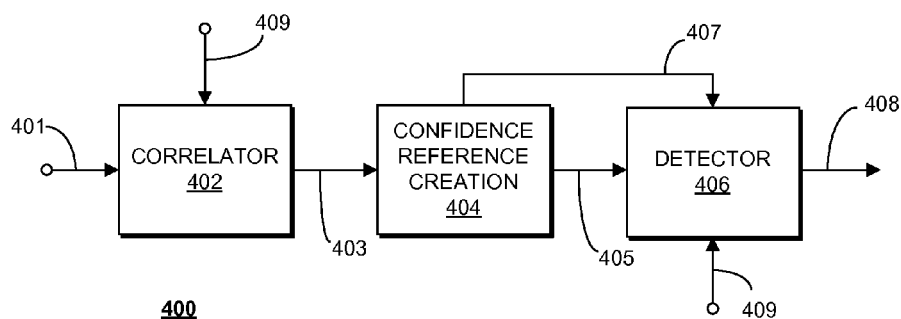
FIG. 4 shows a block diagram schematic of an exemplary correlation detection unit such as correlation detection unit, in accordance with an embodiment.

FIG. 4 shows a block diagram schematic of an exemplary correlation detection unit 400, such as correlation detection unit 316, in accordance with one embodiment. The present figure provides a more detailed example of the correlation detection unit 316. A correlator 402 receives an input 401 from the receiver, which is in the form of a digital stream or sequence that is output by the demodulator 314. The correlator can be a conventional correlator where each signal state (e.g. phase or binary digit) occurs in a timed sequence, and the correlator can shift each signal state into a sequential register in the correlator. At each bit period, the contents of the sequential register can be processed by the correlator to determine a degree of correlation with the modulation code 409 provided or selected by modulation code selector 302. The correlator provides a correlator output signal 403 indicative of the correlation between the input and the modulation code at each bit period. The correlator output signal 403 is provided to a confidence reference level creation unit 404. The confidence reference level creation unit 404 generally creates or generates a confidence reference level which is a signal based on a conditioned average of the correlator output.

The conditioned average, in addition to using an averaging process, further uses a modification process to suppress cross correlation and autocorrelation noise. The conditioned average can be created or generated in a variety of ways, including by the use of peak suppression, or by use of differentiation prior to averaging. Peak suppression modifies the correlator output signal by detecting peaks using a first averaging process as a peak reference and suppressing peaks that exceed the first average, resulting in a peak-suppressed average which is then averaged by a second averaging process. Differentiation modifies the correlator output applying a differentiation process to the correlator output signal before averaging to create the confidence reference level. The confidence reference creation unit 404 can modify the output of the correlator, or leave it unmodified, depending on the embodiment employed, before providing a signal 407 derived from the correlator output signal 403 to a peak detector 406 for comparison with the output 405 of the confidence reference creation unit by the peak detector 406. The signal 407 derived from the correlator output signal 403 can therefore be the correlator output signal, passed directly to the peak detector 406, or it can be further processed before being fed to the peak detector 406. The confidence reference level generator or creation unit 404 creates a confidence reference level 405 which is a dynamic electrical signal level derived from averaging and other operations performed on the correlator output signal 403. The peak detector 406 compares the signal 407 derived from the correlator output signal 403 with the confidence reference level 405 to identify peaks in the correlator output that indicate a sufficient degree of correlation between the present signal state of received signal 401 with the modulation code 409, and provides an output 408 accordingly indicating detection of an echo of the transmitted signal using the modulation code 409. The confidence reference level creation unit 404 processes the correlator output in a way that tends to suppress the effects of cross-correlation and auto-correlation noise in the correlator output, either by suppressing peaks in the correlator output or by a differentiation process, to generate the confidence reference level 405. Once the correlator output signal 403 has been modified and averaged, it can be scaled up by preselected factor or amount to produce the confidence reference level. By modifying and averaging the correlator output signal, the confidence reference level will generally track with the average of the correlator output signal. The peak detector 406 will detect peaks in the correlator output signal as periods where the correlator output signal (or a signal derived from the correlator output signal) 407 sufficiently exceeds the confidence reference level 405, indicating that the present signal state of the received signal contains the modulation code. Some of the peaks may be due to cross correlation and autocorrelation noise. Thus, the peak detector use a prescribed criteria in order to determine peaks produced by the echo of the transmitted signal, which will be higher above the confidence reference level than peaks caused by cross correlation and autocorrelation noise.

Figure 5:
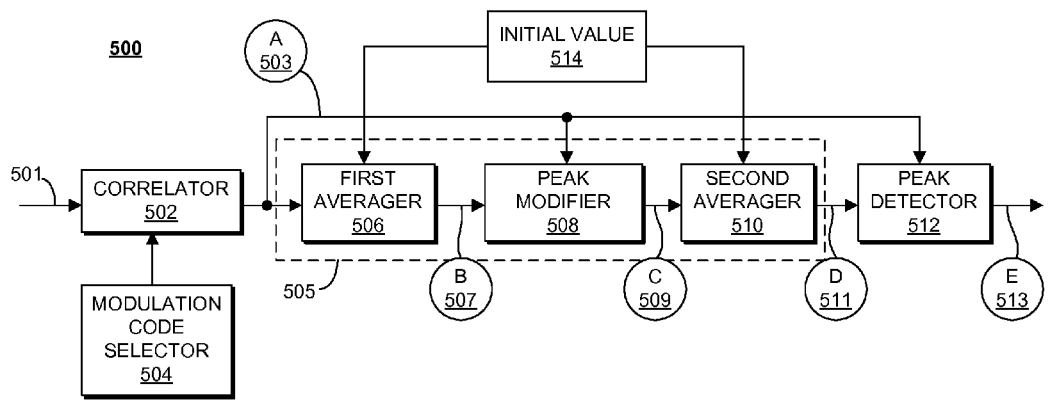
FIG. 5 shows a block schematic diagram for a correlation unit in accordance with one embodiment.

FIG. 5. shows a block schematic diagram for a correlation unit 500 in accordance with one embodiment using peak suppression to generate the confidence reference level. The correlation unit 500 is an example of an embodiment of correlation detection unit 316, and comprises a correlator 502, which can be substantially the same as correlator 402. Various lines are labeled A-E in addition to reference numerals, and the labels A-E will be used to refer to the exemplary signal illustrations in FIGS. 6, and 8-10. Correlator 502 receives a signal 501 to be processed and compared to a code provided by a modulation code selector 504. The input signal can be the digital output of a demodulator, such as demodulator 314. The correlator 502 forms a correlator output signal 503, also labeled as signal "A," which is provided to confidence reference creation unit 505 and peak detector 512. The correlator output signal 503 indicates the degree to which the presently stored time slice of the input signal correlates with the provided code. Every bit interval the demodulator produces the next bit which is shifted into the correlator register, and the oldest bit is then shifted out.

In the present embodiment, the confidence reference creation unit 505 comprises a first averager 506, peak modifier 508, and a second averager 510. The first averager 508 forms a correlation average "B" which is output on line 507 to peak modifier 508. The first averager 506 can be a window averager which averages the correlation signal over a specified window of time, beginning with the value of the correlation signal at a present time. That is, just as the correlator stores bits output from the demodulator in a shift register, the correlator output values can be likewise stored for a number of bit intervals and averaged by the first average 506. Correlation average "B" 507 is fed to the peak modifier 508. The peak modifier compares the correlation output signal "A" 503 against the correlation average "B" 507 using a first preselected criteria to determine peaks which exceed the correlation average "B" 507 in the correlator output signal "A" 503. The first pre-selected criteria can be for example, scaling the correlation average "B" 507 by a pre-selected factor and determining if the correlator output exceeds the scaled correlation average, and can further include considerations such as the degree to which the correlator output exceeds the scaled correlation average. Any peaks detected are suppressed by the peak modifier 508 to form a peak suppressed correlation signal "C" 509. Peaks can be suppressed by scaling the peak values down, setting the peak values to a pre-selected level, setting the peak values to values proportional to the present correlation average "B" 507, and so on. Setting the peak values to a different value comprises determining that the present value of the correlator output "A" 503 exceeds the correlation average "B" by the first pre-selected criteria, and replacing the peak value with a different value. When the correlator output "A" 503 does not exceed the correlation average by the first pre-selected criteria, it can be simply passed through unmodified. The peak suppressed correlation signal "C" is therefore essentially a duplicate of the correlator output signal but with peaks being suppressed. The peak suppressed correlation signal 509 is fed to the second averager 510 to form a peak suppressed correlation average "D" 511. The second averager 510 can be a window averager like first averager 506. The peak suppressed correlation average "D" 511 is fed to the peak detector 512 which compares the correlator output signal "A" 503 against the peak suppressed correlation average "D" 511 according to a second pre-selected criteria. When the correlator output "A" 503 exceeds the peak suppressed correlation average by the second pre-selected criteria, the peak detector forms an indication of peak detection at peak detection output "E" 513. By comparing the correlator output to the peak suppressed correlation average 511, the tendency of cross correlation and auto correlation noise to cause false detection can be greatly reduced if not substantially eliminated.

Upon initial operation of the circuit of FIG. 5, starting the various elements at a zero value may have a detrimental effect on performance. To avoid such initialization issues, an initial value 514 can be entered into averager 506 and averager 510. It is also contemplated that the first value received at any circuit element can be used to seed the circuit element. In another alternative, the averagers may only average values actually received, up to the selected number of values stored by the averager. For example, if an averager averages the present value with the 4 most recent values, as the first 5 values are received, the averager first uses the first received value as the average, the next received value is averaged with the second received value, and so on, until the averager is averaging the most recent 5 values, and older values are pushed out of the averager's window register, which is a shift register.

The circuit elements of FIG. 5 can be implemented in a semiconductor device, such as, for example, a general purpose microprocessor, a microcontroller, a digital signal processor, discrete logic circuits, combinations thereof, and so on, in conjunction with appropriate instruction code in accordance with the functionality described herein. Likewise, the functionality can also be implemented in a purely hardware embodiment. The received signal 501 can be a digital signal having discrete values occurring at discrete time intervals, as is known. As each new value or bit for the signal is received it can be shifted into a shift register of the correlator, and the correlation operation can then be performed with the new value included with previous values. The first and second averagers 506, 510 can be implemented as infinite impulse response (IIR) filters with appropriate delay elements to achieve the desired averaging effect.

FIGS. 6-10 show various graphs representative of signals A-E as labeled in FIG. 5. The specific examples shown are meant to be illustrative, and are therefore simplified, and not meant to show actual signals. The graph charts all graph signal magnitude over time. Magnitude represents volts or any other suitable physical units. The signals graphed are labeled A-E, which correspond to the same labels in FIG. 5, indicating where in the circuit of FIG. 5 the particular signal would be evident for the particular example. Various features of the signals may be exaggerated in scale for the sake of example. Furthermore, the signals represented in the graphs illustrate signals as they might appear in a receiver and correlation unit of an acoustic distance measurement circuit while the acoustic distance measurement circuit is listening (receiving) for an echo of a recently transmitted acoustic pulse that has been encoded with a modulation code as provided by modulation code selector 504.

Figure 6:
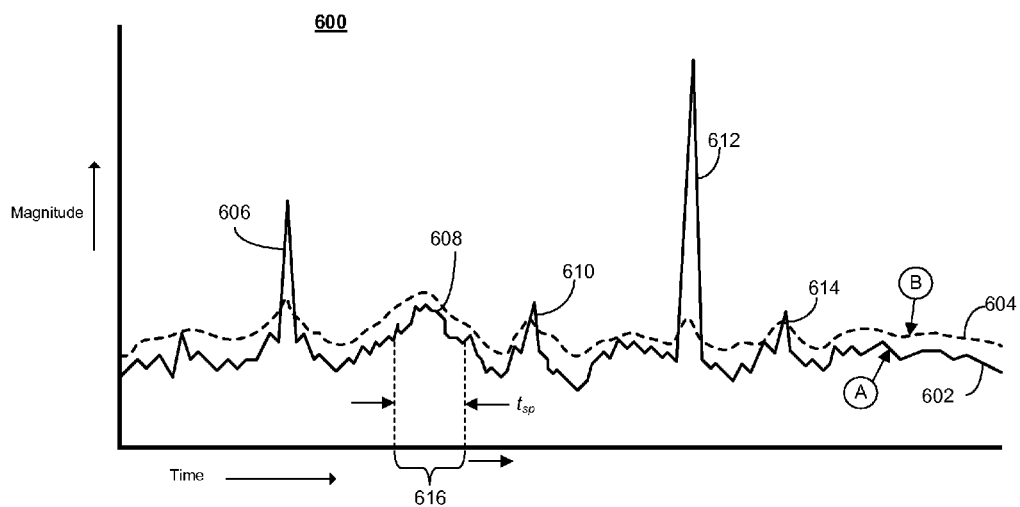
FIG. 6 shows a graph chart of an exemplary correlator output, and a correlation average, in accordance with one embodiment.

FIG. 6 shows a graph chart 600 of an exemplary correlator output signal 602, and a correlation average 604, in accordance with one embodiment. The correlator output signal 602 represents an exemplary output of a correlator such as correlator 502 that can be produced by correlating an input signal such as signal 501, and a modulation code from modulation code selector 504. The hypothetical correlator output signal 602 contains several peaks 606, 608, 610, 612, and 614. The smaller peaks can be the result of auto-correlation noise, cross-correlation noise, or receiving an echo signal containing the modulation code provided to the correlator. Auto-correlation noise results from the received echo as the receiver and correlation unit are processing the received signal. Cross-correlation noise comes from receiving acoustic signals from other transmitters, which are generally using different modulation codes.

The correlation average 604 is formed by averaging the correlator output over a selected moving window of time, such as window 616. The window is a selected period of time over which samples are taken and stored periodically. The moving average can be centered around the calculated point, such as the center of the window. The window period 616 is shown here in the middle of the graph for clarity of example; those skilled in the art will realize that the window will generally contain the most recently acquired or produced samples. Each new sampling period or bit interval shifts a new value into the averager register, which shifts (deletes) the oldest sample value out of the averager register, and a new average is computed for the new window. As shown here, the correlation average 604 is scaled up by preselected criteria, such as a constant factor, and corresponds to the value or signal of line 507 of FIG. 5. As indicated, peaks 606, 610, 612, and 614 in the correlator output exceed the correlation average by at least the preselected criteria. Peaks 610 and 614, in the example, are caused by auto-correlation or cross-correlation noise. If the scaled correlator average were the only criteria, peaks 610 and 614 could result in false detections of a received echo of the acoustic signal transmitted with the modulation code being used by the correlator.

Figure 8:
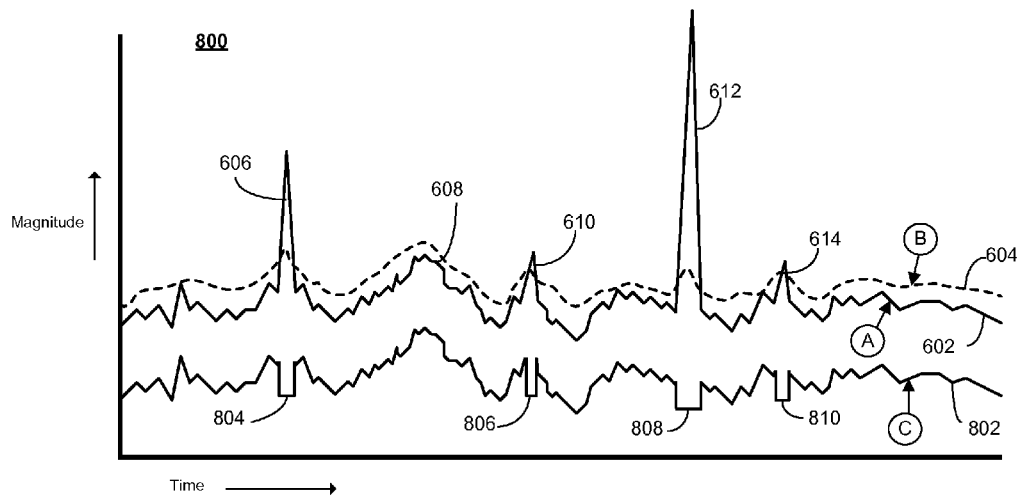
FIG. 8 shows a graphs chart of the correlator output, correlation average, and a peak-suppressed correlation signal.

FIG. 8 shows a graphs chart 800 of the correlator output 602, correlation average 604 and a peak-suppressed correlation signal 802 which is for clarity of the drawing shifted down. The peak-suppressed correlation signal is formed, for example, by the peak modifier 508. Peaks in the correlator output, as defined by excursions of the correlator output signal 602 which exceed the correlation average by preselected criteria, are suppressed by the peak modifier. Portions or values of the correlator output which are not identified as peaks or peak values are passed through the peak modifier. As a result the peak-suppressed correlator output has suppressed peaks 804, 806, 808, and 810, corresponding to peaks 606, 610, 612, and 614, respectively. As shown here the peaks are suppressed by setting them to a static value that is generally lower than the surrounding values of the correlator output simply for clarity of illustration. The peak values can be suppressed by any of a variety of techniques, such as, for example, setting them equal to the correlation average, scaling them down by a preselected scaling factor, or setting them to a static value.

Figure 9:
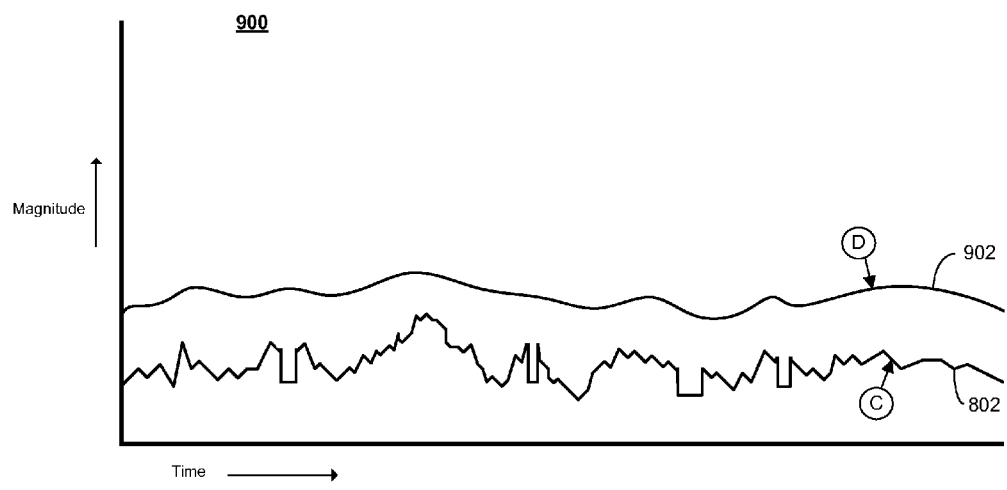
FIG. 9 shows a graph chart of a peak suppressed correlation signal and a peak suppressed correlation average.

FIG. 9 shows a graph chart 900 of a peak suppressed correlation signal 802 and a peak suppressed correlation average 902. The peak suppressed correlation average 902 is produced by averaging the peak suppressed correlation signal 802, as can be performed, for example, by the second averager 510. The peak suppressed correlation average 902 is shown offset from the peak suppressed correlation signal 802 for clarity. The peak suppressed correlation average 902 tends to be flatter than the correlation average 604 since peaks in the correlator output have been suppressed or otherwise reduced.

Figure 10:
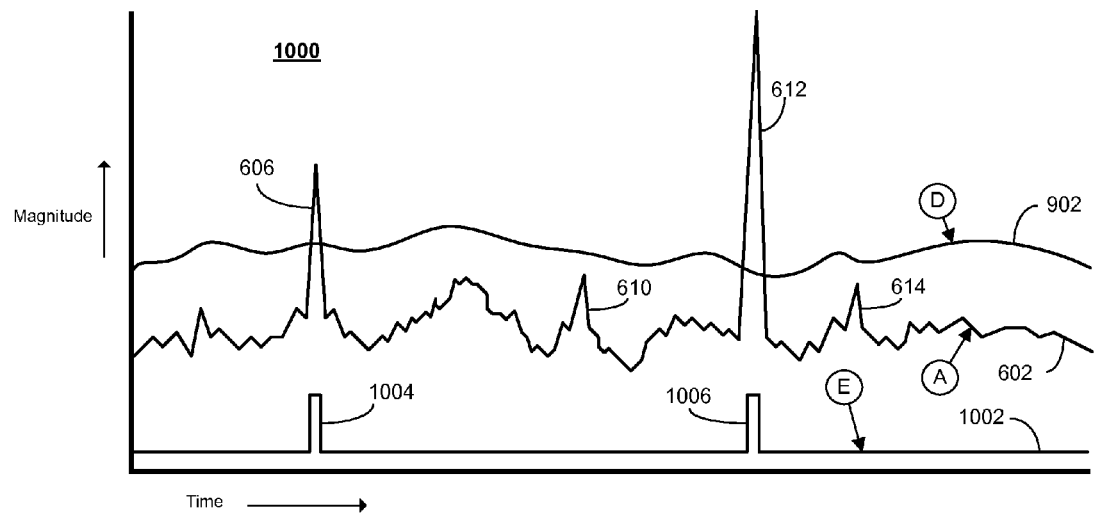
FIG. 10 shows a graph chart illustrating how the peak suppressed correlation average can be compared with the correlator output according to a pre-selected criteria to detect correlation peaks resulting from echoes in the signal received by an acoustic distance measurement circuit, in accordance with an embodiment.

FIG. 10 shows a graph chart 1000 illustrating how the correlator output signal 602 can be compared with the peak suppressed correlation average 902 according to a pre-selected criteria to detect correlation peaks resulting from echoes in the signal received by an acoustic distance measurement circuit, in accordance with an embodiment. The preselected criteria applied to the peak suppressed correlation average 902 can be, for example, a scaling factor. The scaling factor can be static, or determined by the relative magnitude of the peak suppressed correlation average 902. Peak detector output signal 1002 indicates by output pulses 1004 and 1006 that the peaks 606 and 612 can be considered as true received echoes. In contrast peaks 610 and 614 do not result in an indication of peak detection as they do not exceed the peak suppressed correlation average 902 by the prescribed criteria and are considered a product of correlation noise.

Figure 7:
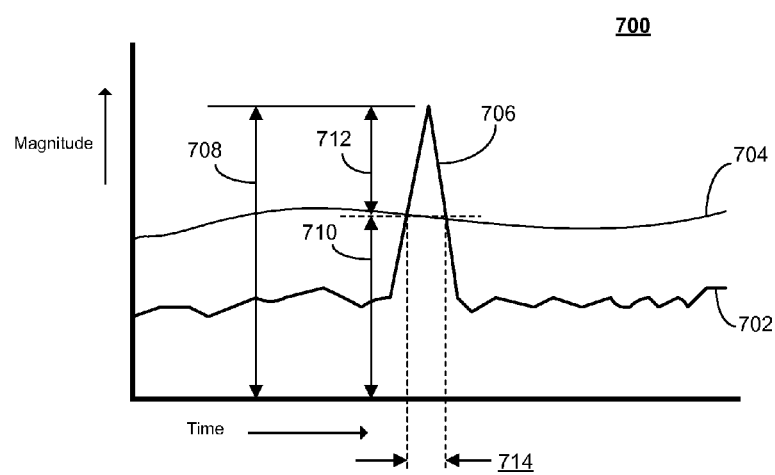
FIG. 7 shows a graph chart illustrating how a peak can be determined according to one embodiment.

FIG. 7 shows a graph chart 700 illustrating how an echo peak is detected based on prescribed criteria representing a probabilistic confidence level that is determined by comparing the confidence reference level 704 and a maximum peak value of a peak in the correlator output signal 702. Peaks are defined as the portion of the correlator output signal 702 that exceed the confidence reference level 704. The confidence level represents a sufficient probability that, at a measured distance (derived from time of transmission), an obstacle exists and has produced the correlator peak in the received signal presently under consideration. The confidence level can be calculated as an absolute comparison between the confidence reference level and the correlator output signal, or as a ratio of the two signals. A prescribed criteria indicating the absolute or relative difference between the confidence reference level and the correlator output signal is selected a priori corresponding to the desired probability. The prescribed criteria can be determined experimentally, based on the particular implementation and application, such as by locating several interfering transmitters and a test obstacle near a transmitter under test, and while the interring transmitters transmit randomly selected codes, observing the peak value of peaks produced by echoes from the test obstacle. The peaks produced by the test obstacle can be identified by amplitude, but also by knowing the distance to the test obstacle and hence when the peak should occur relative to the time of transmission. A relative confidence level calculation is the ratio between a maximum amplitude 708 of peak 706 and confidence reference level 704, which has a value 710 at the peak amplitude 708. An absolute confidence level calculation can be determined as the value 712 which is the difference between the peak amplitude value 708 of peak 706 and the confidence reference level 704, which has a value 710 at the peak amplitude 712. Accordingly, when a peak of the correlator output signal exceeds the confidence reference level by the prescribed criteria, it indicates that there is a sufficient confidence level that the present signal state of the received signal substantially contains the modulation pattern, which further indicates an echo of the transmitted signal modulated with the modulation pattern has been received at the present time.

Figure 11:
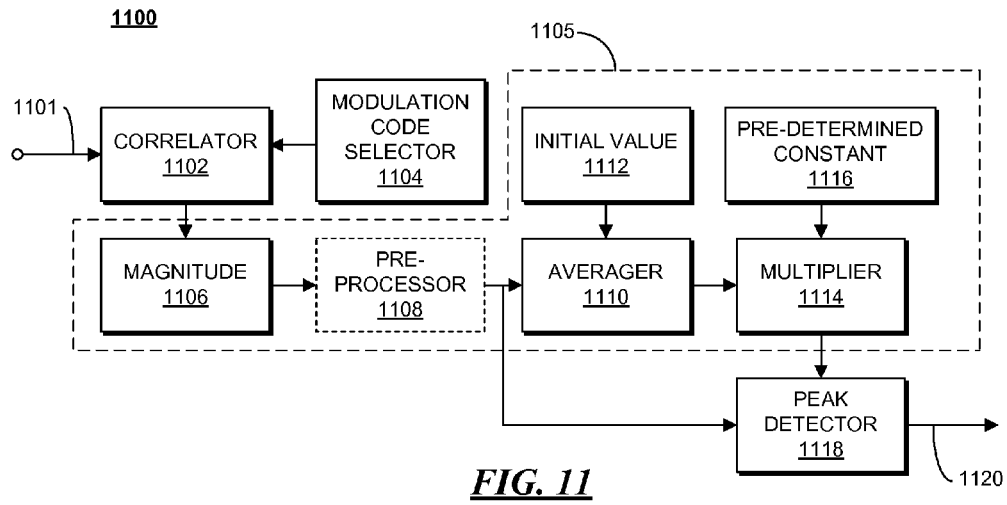
FIG. 11 shows a block schematic diagram of a correlation unit in accordance with an embodiment.

FIG. 11 shows a block schematic diagram of a correlation unit 1100 in accordance with a second embodiment. The present embodiment uses a different approach to generating the confidence reference level from the embodiment shown in FIG. 5, and suppresses the low frequency component of a signal produced at a receiving transducer when multiple different signals have been transmitted, using different modulation codes, at substantially the same time. Rather than using peak suppression, the present embodiment uses a different form of modified averaging. A digitized, demodulated signal 1101 is input to a correlator 1102, which can be substantially the same as correlator 402. The correlator 1102 correlates the input signal 1101 with the transmitted modulation code provided by modulation code selector 1104. The output of the correlator 1102 is fed to a confidence reference creation unit 1105, which performs a modified averaging operation on the correlator output signal. In the present embodiment, the correlator output is fed to a magnitude circuit block 1106 which converts the complex numbers output by the correlator 1102 to real (and positive) magnitudes. A differential pre-processor 1108 can be optionally included between the magnitude block 1106 and an averager 1110, which can be substantially the same as averagers 506, 510. The differential pre-processor 1108 of the present embodiment contains a differentiation circuit and performs a differential operation on the correlator magnitude values output by the magnitude block 1106, and further correlates the differentiated magnitude signal with a preselected master vector value. The differentiation operation can be a digital operation which is similar to performing a mathematical derivative (as in calculus) operation on the signal. The effect of the differential pre-processor is to sharpen peaks while suppressing low frequency components of the received signal. The output of the pre-processor is fed to the averager 1110 as the signal derived from the correlator output signal. The averager computes a time windowed average of the output of the pre-processor 1108. The output of the averager 1110 is scaled by a multiplier 1114 to produces scaled average that is provided to a peak detector 1118. The multiplier 1114 can apply a constant scaling factor, or it can apply a scaling factor that is dependent on some context, such as the present magnitude of the average. The peak detector 1118 compares the scaled average provided by the multiplier 1114 with the signal provided to the averager 1110. When the level of the signal fed to the averager 1110 exceeds the output level of the multiplier 1114 by preselected criteria, a peak is detected and indicated at the output 1120 of the peak detector.

The criteria for peak detection can be substantially similar to that illustrated in FIG. 7, as described herein.

Figure 12:
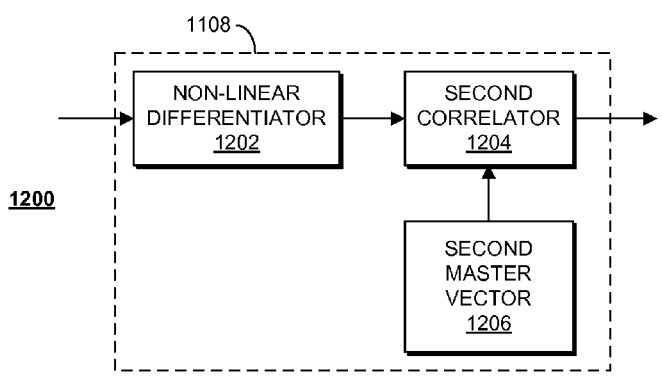
FIG. 12 shows a block schematic diagram of a differential pre-processor in accordance with an embodiment.

FIG. 12 shows a block schematic diagram of an overview 1200 of a differential pre-processor 1108 in accordance with an embodiment. The output of the magnitude block 1106 of FIG. 11 is fed to a non-linear differentiator 1202. The non-linear differentiator 1202 performs a differentiation operation which tends to suppresses low frequency signal components and to sharpen the peaks in the correlator magnitude signal provided by the magnitude block 1106. The output of the non-linear differentiator 1202 is provided to a second correlator 1204 which correlates the differentiated output of the non-linear differentiator 1202 with a second master vector 1206. The second master vector is a predetermined digital code or sequence derived from a differentiated ideal peak response, which is generally different from a first master vector which is used as the modulation code. The ideal peak response is based on the modulation code used in the transmitted signal of interest. The output of the second correlator 1204 is provided to the averager 1110.

Figure 13:
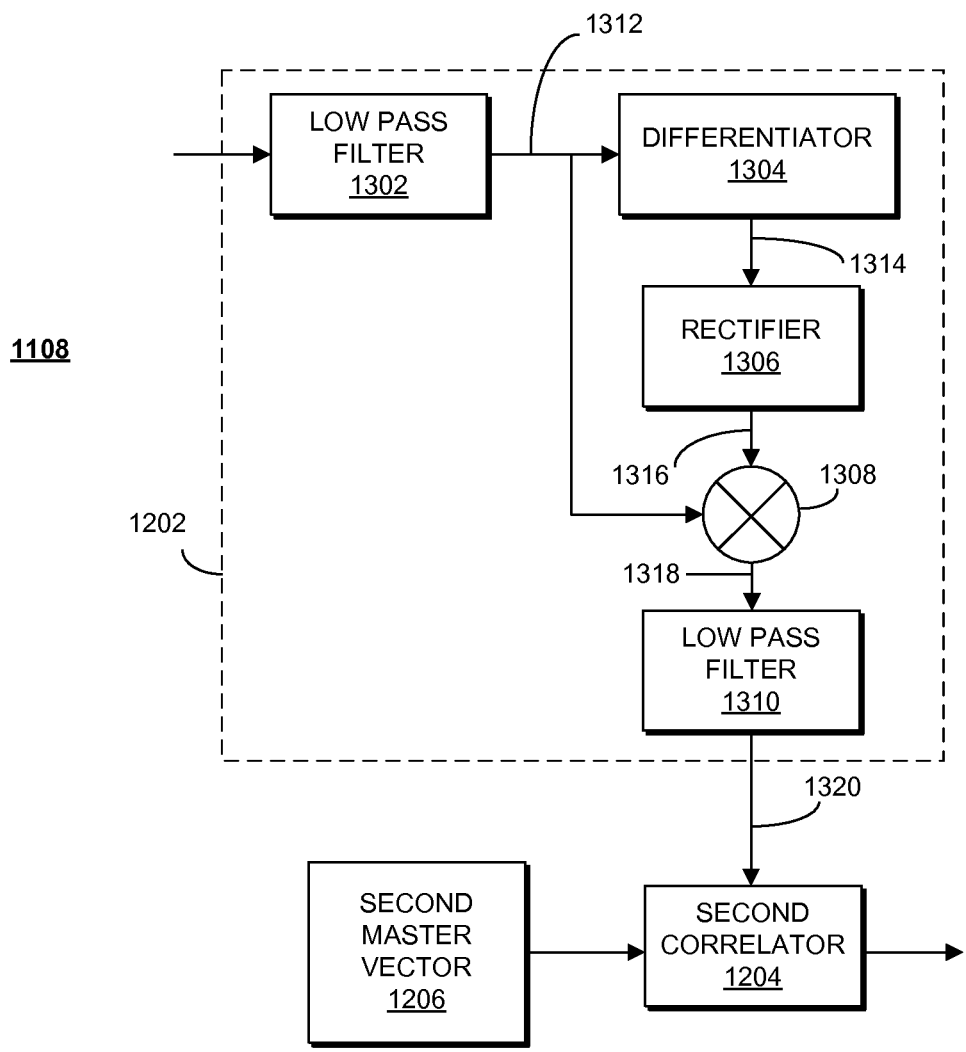
FIG. 13 shows a block schematic diagram of a differential pre-processor in accordance with an embodiment.

FIG. 13 shows a detailed block schematic diagram of a differential pre-processor 1108 in accordance with an embodiment. The pre-processor 1108 includes the non-linear differentiator 1202 which receives the signal from the magnitude block 1106 at a first low pass filter 1302. The low pass filter can be realized using the form $H(z)=\Sigma a_n * Z^{-n}$, where $H(z)$ is the value of the present signal state, and $Z^{-n}$ represents the values of previous signal states. The filtered output 1312 of the first low pass filter 1302 is fed to a differentiator 1304, which can be implemented using the form $H(z)=1-Z^{-1}$. The differentiator 1304 produces an intermediate differentiated signal 1314 which can be rectified by rectifier 1306 by performing an absolute value operation on the intermediate differentiated signal to produce a rectified differentiated signal 1316. The rectified differentiated signal is then multiplied via multiplier 1308 with the output of the first low pass filter 1302 to produce a product signal 1318. The product signal 1318 is filtered by a second low pass filter 1310. The output 1320 of the second low pass filter 1310 is the differentiated signal that is provided by the non-linear differentiator 1202 to the second correlator 1204. The second low pass filter 1204 can have the same form of the first low pass filter 1302.

As described herein embodiments of the invention can be implemented in numerous configurations. Those skilled in the art will recognize that one embodiment can include a semiconductor device having a correlator that forms a correlator output signal indicating a present level of correlation between a known pattern and a received signal. The semiconductor device further includes a confidence reference level generator that forms a confidence reference level based on a modified average of a signal derived from the correlator output signal, and a peak detector which compares the signal derived from the correlator output with the confidence reference level and forms an indication of peak detection when the signal derived from the correlator output exceeds the confidence reference level by a first prescribed criteria that indicates a present signal state of the received signal contains the known pattern. The modified average results from modifying the correlator output signal, or a signal derived from the correlator output signal, to suppress peaks in the correlator output signal to form a modified correlator output signal, and then performing an averaging process on the modified correlator output signal.

Those skilled in the art will further appreciate that another embodiment can include a method of forming a semiconductor device is provided which includes configuring the semiconductor device to form a correlator output signal that indicates a present level of correlation between a known pattern and a received signal, configuring the semiconductor device to form a confidence reference level based on a modified average of a signal derived from the correlator output signal, and configuring the semiconductor device to form an indication of peak detection when the signal derived from the correlator output signal exceeds the confidence reference level by a first prescribed criteria.

Furthermore, those skilled in the art will recognize that embodiments of the invention can include devices, such as an obstacle detection device including a demodulator that demodulates a received signal received from an ultrasonic transducer to form a demodulated signal, a correlator that forms a correlator output signal indicating a present level of correlation between a pre-selected modulation pattern and the demodulated signal, a confidence reference level generator that forms a confidence reference level based on a modified average of a signal derived from the correlator output signal in which cross correlation noise resulting from the presence of modulation patterns other than the pre-selected modulation pattern in the received signal and autocorrelation noise resulting from the pre-selected modulation pattern in the correlator output signal are suppressed, and a peak detector which compares the signal derived from the correlator output with the confidence reference level and forms an indication of peak detection when the signal derived from the correlator output exceeds the confidence reference level by a first prescribed criteria indicative of a desired confidence level that an echo of a signal transmitted using the modulation code has been received.

This invention can be embodied in other forms without departing from the spirit or essential attributes thereof. Accordingly, reference should be made to the following claims, rather than to the foregoing specification, as indicating the scope of the invention.

What is claimed is:

1. A semiconductor device, comprising:
  a correlator that forms a correlator output signal indicating a present level of correlation between a known pattern and a received signal;
  a confidence reference level generator that forms a confidence reference level based on a modified average of a signal derived from the correlator output signal, wherein the confidence reference level generator differentiates a magnitude signal of the correlator output signal to form a differentiated signal, and correlates the differentiated signal to a master vector to form the signal derived from the correlator output signal; and
  a peak detector which compares the signal derived from the correlator output signal with the confidence reference level and forms an indication of peak detection when the signal derived from the correlator output signal exceeds the confidence reference level by a first prescribed criteria that indicates a present signal state of the received signal contains the known pattern.

2. The semiconductor device of claim 1, wherein the signal derived from the correlator output signal is substantially the correlator output signal, the confidence reference level generator comprises:
  a first averager that averages the correlator output signal for a selected period of time to form an averaged correlator output signal;
  a peak suppressor that compares the correlator output signal with the averaged correlation signal and forms a peak-suppressed correlation signal by suppressing peaks in the correlator output which exceed the correlation average by a second prescribed criteria; and a second averager which averages the peak-suppressed correlation signal to form a peak suppressed correlation average, wherein the peak suppressed correlation average is provided to the peak detector as the confidence reference level.

3. The semiconductor device of claim 2, wherein the peak suppressor reduces the peaks by at least one of linear scaling down peak values, replacement of the peak values with values proportional to the correlation average, or reducing the peak values to a pre-selected level.

4. The semiconductor device of claim 2, wherein the correlation average and peak suppressed correlation average are each initialized at a non-zero value.

5. The semiconductor device of claim 1, wherein the first prescribed criteria is indicative of a desired confidence level that an echo of a signal transmitted using the known pattern has been received and is determined either as a relative ratio between a peak amplitude value of the signal derived from the correlator output and the confidence reference level at the peak amplitude value or as an absolute difference between the peak amplitude value of the signal derived from the correlator output signal and the confidence reference level at the peak amplitude value.

6. The semiconductor device of claim 1, wherein the confidence reference level generator comprises:
a magnitude circuit that forms the magnitude signal based on the correlator output signal, the magnitude signal having only real components which are positive; and
a differential pre-processor that forms the signal derived from the correlator output signal from the magnitude signal using a differentiation circuit.

7. The semiconductor device of claim 6, wherein the differential pre-processor comprises:
a non-linear differentiator that receives the signal from the magnitude circuit and forms the differentiated signal; and
a second correlator that forms a differentiated correlator output based on a correlation between the differentiated signal and the master vector, the master vector representing an idealized differentiated peak based on the known pattern, wherein the differentiated correlator output forms the signal derived from the correlator output signal.

8. The semiconductor device of claim 7, wherein the non-linear differentiator comprises:
a first low pass filter that filters the output of the magnitude circuit and forming a filtered output;
a differentiator circuit that digitally differentiates the filtered output of the first low pass filter to form an intermediate differentiated signal;
a multiplier circuit that multiplies the filtered output of the first low pass filter with the intermediate differentiated signal to form a product signal; and
a second low pass filter that filters the product signal to form the differentiated signal provided to the second correlator.

9. A method of forming a semiconductor device, comprising:
configuring the semiconductor device to form a correlator output signal that indicates a present level of correlation between a known pattern and a received signal;
configuring the semiconductor device to form a confidence reference level based on a modified average of a signal derived from the correlator output signal;
forming the signal derived from the correlator output signal by:
determining a magnitude of the correlator output signal to form a magnitude signal;
differentiating the magnitude signal to form a differentiated signal; and
correlating the differentiated signal to a master vector signal to form the signal derived from the correlator output signal; and
configuring the semiconductor device to form an indication of peak detection when the signal derived from the correlator output signal exceeds the confidence reference level by a first prescribed criteria that indicates a present signal state of the received signal contains the known pattern.

10. The method of claim 9, wherein configuring the semiconductor device to form the confidence reference level comprises:
configuring the semiconductor device to form a correlation average from the correlator output signal;
configuring the semiconductor device to form a peak-suppressed correlation signal by suppressing peaks in the correlator output which exceed the correlation average by a second prescribed criteria; and
configuring the semiconductor device to form a peak suppressed correlation average from the peak-suppressed correlation signal, wherein the peak suppressed correlation average is provided as the confidence reference level.

11. The method of claim 10, wherein configuring the semiconductor device to form a peak-suppressed correlation signal comprises at least one of:
configuring the semiconductor device to scale peaks of the correlation signal down by a preselected factor; or
configuring the semiconductor device to replace peak values of the correlation signal with a pre-selected value.

12. The method of claim 11, wherein correlating the differentiated signal to the master vector signal to form the signal derived from the correlator output signal comprises:
forming the master vector corresponding to an idealized peak based on the known pattern.

13. The method of claim 12 wherein, configuring the semiconductor device to form a differentiated signal comprises:
configuring the semiconductor device to form a filtered output by low pass filtering the magnitude signal;
configuring the semiconductor device to form an intermediate differentiated signal by differentiating the filtered output;
configuring the semiconductor device to form a rectified differentiated signal by rectifying the intermediate differentiated signal
configuring the semiconductor device to form a product signal by multiplying the filtered output with the rectified differentiated signal; and
configuring the semiconductor device to form the differentiated signal by low pass filtering the product signal.

14. An ultrasonic obstacle detection circuit, comprising:
a demodulator that demodulates a received signal received from an ultrasonic transducer to form a demodulated signal;
a correlator that forms a correlator output signal indicating a present level of correlation between a pre-selected modulation pattern and the demodulated signal;
a confidence reference level generator that forms a confidence reference level based on a modified average of a signal derived from the correlator output signal in which cross correlation noise resulting from the presence of modulation patterns other than the pre-selected modulation pattern in the received signal and autocorrelation noise resulting from the pre-selected modulation pattern in the correlator output signal are suppressed, wherein the confidence reference level generator differentiates a magnitude signal of the correlator output signal to form a differentiated signal, and correlates the differentiated signal to a master vector to form the signal derived from the correlator output signal; and a peak detector which compares the signal derived from the correlator output with the confidence reference level and forms an indication of peak detection when the signal derived from the correlator output exceeds the confidence reference level by a first prescribed criteria that indicates a present signal state of the received signal is an echo of a transmitted signal that was modulated using the pre-selected modulation pattern.

15. The ultrasonic obstacle detection circuit of claim 14, wherein the confidence reference level generator comprises:

a magnitude circuit that forms a magnitude signal based on the correlator output signal, the magnitude signal having only real components which are positive; and a differential pre-processor that forms the signal derived from the correlator output signal from the magnitude signal using a differentiation circuit.

16. The ultrasonic obstacle detection circuit of claim 15, wherein the differential pre-processor comprises:

a non-linear differentiator that receives the signal from the magnitude circuit and forms the differentiated signal; and a second correlator that forms a differentiated correlator output based on a correlation between the differentiated signal and the master vector, the master vector representing an idealized differentiated peak based on the pre-selected modulation pattern, wherein the differentiated correlator output forms the signal derived from the correlator output signal.

17. The ultrasonic obstacle detection circuit of claim 16, wherein the non-linear differentiator comprises:

a first low pass filter that filters the output of the magnitude circuit and forming a filtered output;

a differentiator circuit that digitally differentiates the filtered output of the first low pass filter to form an intermediate differentiated signal;

a rectifier circuit that rectifies the intermediate differentiated signal to form a rectified differentiated signal;

a multiplier circuit that multiplies the filtered output of the first low pass filter with the rectified differentiated signal to form a product signal; and a second low pass filter that filters the product signal to form the differentiated signal provided to the second correlator.

18. The ultrasonic obstacle detection circuit of claim 14, wherein the confidence reference level generator comprises:

a first averager that averages the correlator output signal over a window of time to form an averaged correlator output signal;

a peak suppressor that compares the correlator output signal with the averaged correlation signal and forms a peak-suppressed correlation signal by suppressing peaks in the correlator output which exceed the correlation average by a prescribed criteria; and a second averager which averages the peak-suppressed correlation signal to form a peak suppressed correlation average, wherein the peak suppressed correlation average is provided to the peak detector as the confidence reference level.

19. The ultrasonic obstacle detection circuit of claim 18, wherein the peak suppressor reduces the peaks by at least one of linear scaling down peak values, replacement of the peak values with values proportional to the correlation average, or reducing the peak values to a pre-selected level.

20. The ultrasonic obstacle detection circuit of claim 14, wherein the first prescribed criteria is determined either as a relative ratio between a peak amplitude value of the signal derived from the correlator output and the confidence reference level at the peak amplitude value or as an absolute difference between the peak amplitude value of the signal derived from the correlator output signal and the confidence reference level at the peak amplitude value.

* * * * *